(12) United States Patent
Liu

(10) Patent No.: US 7,213,761 B2
(45) Date of Patent: May 8, 2007

(54) APPARATUS AND PROCESS FOR TWO-STAGE DECODING OF HIGH-DENSITY OPTICAL SYMBOLS

(75) Inventor: Robert M. Liu, Bellevue, WA (US)

(73) Assignee: Microscan Systems Incorporated, Renton, WA (US)

( * ) Notice: Subject to any disclaimer, the term of this patent is extended or adjusted under 35 U.S.C. 154(b) by 181 days.

(21) Appl. No.: 11/088,643

(22) Filed: Mar. 23, 2005

(65) Prior Publication Data

US 2006/0213998 A1  Sep. 28, 2006

(51) Int. Cl.
*G06K 7/10* (2006.01)

(52) U.S. Cl. ............................. 235/462.25; 235/462.01

(58) Field of Classification Search ................................
235/462.01–462.45, 454, 494, 380; 382/149, 382/147, 155, 172; 345/611, 426, 589
See application file for complete search history.

(56) References Cited

U.S. PATENT DOCUMENTS

| | | | | |
|---|---|---|---|---|
| 4,339,745 | A * | 7/1982 | Barber et al. | 382/172 |
| 4,364,089 | A * | 12/1982 | Woolfson | 348/169 |
| 5,979,763 | A | 11/1999 | Wang et al. | |
| 6,614,925 | B2 * | 9/2003 | DeYong et al. | 382/149 |
| 6,628,808 | B1 * | 9/2003 | Bach et al. | 382/115 |
| 2002/0176001 | A1 * | 11/2002 | Trajkovic | 348/169 |
| 2003/0009725 | A1 | 1/2003 | Reichenbach | |
| 2003/0156122 | A1 * | 8/2003 | Donahue et al. | 345/611 |
| 2005/0056699 | A1 * | 3/2005 | Meier et al. | 235/454 |
| 2005/0199721 | A1 * | 9/2005 | Chang et al. | 235/462.1 |
| 2006/0038017 | A1 * | 2/2006 | Carlson et al. | 235/462.24 |
| 2006/0213998 | A1 * | 9/2006 | Liu | 235/462.17 |

FOREIGN PATENT DOCUMENTS

| | | |
|---|---|---|
| EP | 0895175 A1 | 2/1999 |
| EP | 1455296 A1 | 9/2004 |

OTHER PUBLICATIONS

IBM Corporation, "Binary Threholding of Check Images Using Gray Level Histograms", IBM Technical Disclosure Bulletin, vol. 34, No. 4A, Sep. 1991, pp. 218-221.
PCT/US2006/009640, PCT International Search Report and Written Opinion of the International Searching Authority, Jul. 14, 2006.

* cited by examiner

*Primary Examiner*—Thien M. Le
(74) *Attorney, Agent, or Firm*—Blakely, Sokoloff, Taylor & Zafman LLP

(57) ABSTRACT

A process comprising computing a histogram of pixel intensity data collected from a digital image of an optically readable symbol including light and dark elements, thresholding the histogram to classify individual pixels as light pixels, dark pixels or gray pixels, thresholding only the portion of the histogram corresponding to gray pixels to re-classify the gray pixels into dark pixels, light pixels or unresolved gray pixels, and heuristically analyzing each string of unresolved gray pixels to determine the elements of the optically readable symbol that created the string of unresolved gray pixels. An apparatus and system to implement the process.

24 Claims, 7 Drawing Sheets

| PIXEL VALUE ⇒ | | L | G | D | G | D | G | L | G | D | G | L | G | ... |
|---|---|---|---|---|---|---|---|---|---|---|---|---|---|---|
| STRING WIDTH (PIXELS) | Scan Line 1: | 5 | 3 | 1 | 2 | 2 | 3 | 1 | 2 | 2 | 1 | 2 | 4 | ... |
| | Scan Line 2: | 5 | 3 | 1 | 2 | 2 | 2 | 3 | 2 | 1 | 2 | 4 | | ... |
| | Scan Line 3: | 5 | 3 | 1 | 2 | 2 | 2 | 3 | 2 | 1 | 2 | 4 | | ... |
| | Scan Line 4: | 5 | 2 | 2 | 2 | 2 | 2 | 3 | 2 | 1 | 2 | 4 | | ... |
| | Scan Line 5: | 5 | 2 | 2 | 2 | 2 | 2 | 3 | 2 | 1 | 2 | 4 | | ... |
| | Final Value: | 5 | 3 | 2 | 2 | 2 | 2 | 3 | 2 | 1 | 2 | 4 | | ... |

APPARATUS AND PROCESS FOR TWO-STAGE DECODING OF HIGH-DENSITY OPTICAL SYMBOLS

TECHNICAL FIELD

The present invention relates generally to decoding of data encoded in optically readable symbols and in particular, but not exclusively, to an apparatus and process for two-stage decoding of high-density optically readable symbols such as bar codes.

BACKGROUND

FIG. 1A illustrates, in a highly simplified form, a machine vision system 100. The machine vision system 100 can be used to read and decode an optically readable symbol such as bar code 104. A typical bar code is made up of a series of alternating black (dark) or white (light) elements or bars of various widths. The basic elements of the machine vision system 100 are a focusing element 102 and an image sensor 106. In operation of the vision system 100, an optically readable symbol such as a barcode 104 is first positioned in the field of view of the focusing element 102. The focusing element 102 then focuses an image of the barcode 104 onto the image sensor 106. The digital image 105 of the barcode captured by the sensor 106 is then analyzed by other components (not shown) to determine the information encoded in the bar code 104.

FIG. 1B illustrates a phenomenon that occurs with high-density bar codes—that is, bar codes where the widths of the individual light and dark bars begin to get small. As the individual light and dark bars of the barcode become narrower, the widths of the individual light and dark elements in the image captured by the sensor 106 get narrower as well. Eventually, the widths XW of the narrowest light bars and the widths XB of the narrowest dark bars start to be of the same order of magnitude as the widths of individual pixels on the sensor 106. All is well if the images of the black and white bars substantially coincide with the pixels. Black bar 109, for example, is substantially aligned with a pixel on the sensor, and the sensor accurately records that pixel as a "dark" pixel. Similarly, white bar 111 is substantially aligned with a pixel, and the sensor accurately records that pixel as a "light" pixel. Black bar 112, however, is different: it is not aligned with a pixel, but instead spans parts of two pixels. Faced with this situation where each of two pixels is partially spanned by a black bar 112, such that each pixel is half black and half white, the sensor records a two-pixel "gray" area 114. Pixel misalignment of multiple bars can lead to larger gray areas such as three-pixel gray area 116, which results from bar 108 overlapping part of one pixel and bar 110 spanning parts of two pixels. With high-density bar codes, other phenomena besides misalignment can also result in gray pixels. For example, a string of one or more gray pixels might result if one or more of the bars in the image 105 are of non-uniform width, which can result from poor printing of the bar code 104, damage to the barcode 104, or the like.

Decoders that extract information encoded in the barcode 104 have two tasks. First, based on the image captured by the sensor 106—that is, based on the intensities of the pixels in the image—they must re-construct the sequence of black and white bars on the original bar code 104. Having correctly re-constructed the original sequence of the bar code, they then analyze the sequence to extract the encoded information. Available decoders, however, are usually programmed to deal only with image pixels that are either dark or light. Faced with strings of gray pixels, available decoders may not be able to determine the sequence of bars that created the gray areas and may therefore fail to properly decode a symbol. There is thus a need for an apparatus and method for accurately decoding high-density bar codes.

SUMMARY OF THE INVENTION

This application discloses an embodiment of a process comprising computing a histogram of pixel intensity data collected from a digital image of an optically readable symbol including light and dark elements, thresholding the histogram to classify individual pixels as light pixels, dark pixels or gray pixels, thresholding only the portion of the histogram corresponding to gray pixels to re-classify the gray pixels into dark pixels, light pixels or unresolved gray pixels, and heuristically analyzing each string of unresolved gray pixels to determine the elements of the optically readable symbol that created the string of unresolved gray pixels. Also disclosed and claimed are embodiments of an apparatus and system to implement the process.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a system and method for two-stage decoding of high-density optically readable symbols such as bar codes are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 2:
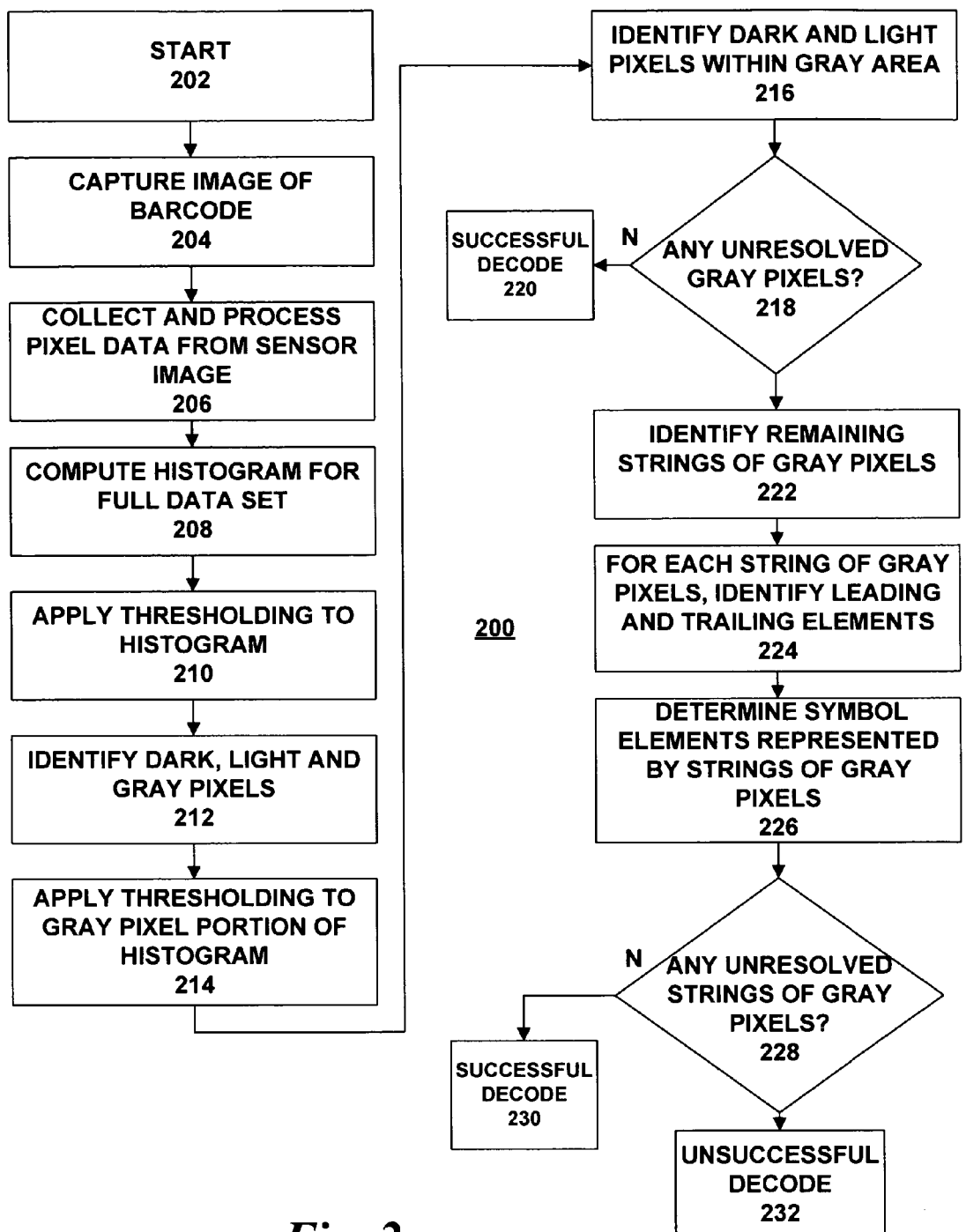
FIG. 2 is a flowchart of an embodiment of a process for decoding a high-density bar code according the present invention.

FIG. 2 illustrates an embodiment of a two-stage process 200 for decoding high-density optically readable symbols such as bar codes. The process starts at box 202 with some preliminary operations. At box 204, an image of the high-density bar code is captured by the sensor and at box 206 pixel intensity data from the image of the bar code is collected from the sensor. One embodiment of a process for collecting pixel intensity data is described below in connection with FIGS. 3A–3B.

Once the preliminary operations are complete, the first stage of decoding begins at box 208, where a histogram is computed from the pixel intensity data collected from the image. At box 210, a thresholding procedure is applied to the histogram data to set lower and upper thresholds. At box 212, the upper and lower thresholds are used to classify each pixel as a light pixel, a dark pixel or a gray pixel. Generally, pixels with intensities below the lower threshold will be classified as dark pixels, pixels with intensities above the upper threshold will be classified as light pixels, and pixels with intensities between the lower and upper thresholds will be classified as gray pixels. Next, at box 214, another round of thresholding is applied only to the part of the histogram that has been identified as the gray pixel area—in other words, to the portion of the histogram between the lower threshold and upper threshold. This second round of thresholding is designed to take a closer look at the gray pixels to see if, with some further thresholding, they can be re-classified as light or dark pixels. At box 216, the process identifies dark and light pixels within the gray area based on the second thresholding. At box 218, the process checks whether there are any remaining gray pixels. If there are no remaining gray pixels—meaning that the second thresholding successfully re-classified all the gray pixels as light or dark—then the re-construction of the bar code is complete and there is a successful decode at box 220. If any gray pixels remain whose classification is unresolved, the process continues to its second stage, which begins at box 222. Further details of this first stage of the process are discussed below in connection with FIGS. 4A–4B.

Figure 1A:
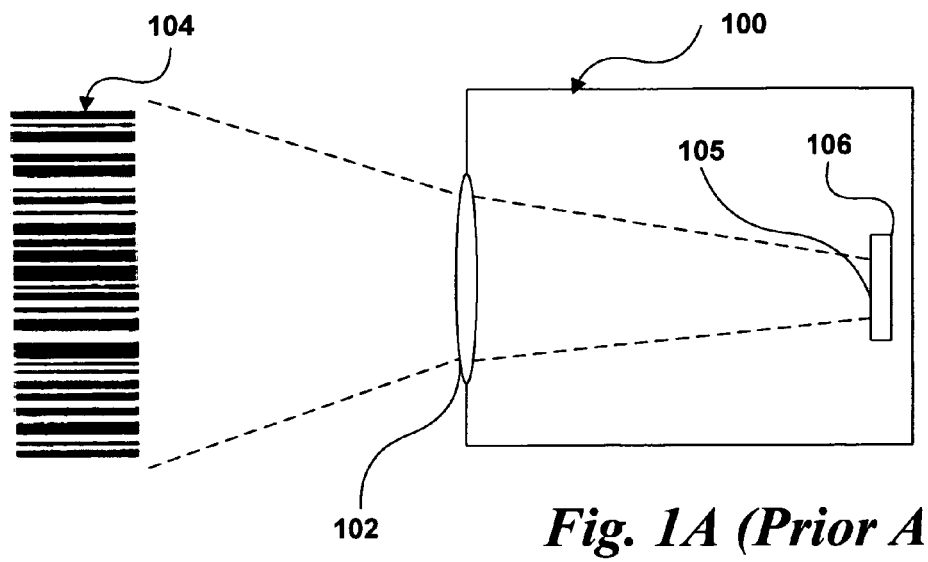
FIG. 1A is a schematic drawing illustrating a simplified vision system.
Figure 1B:
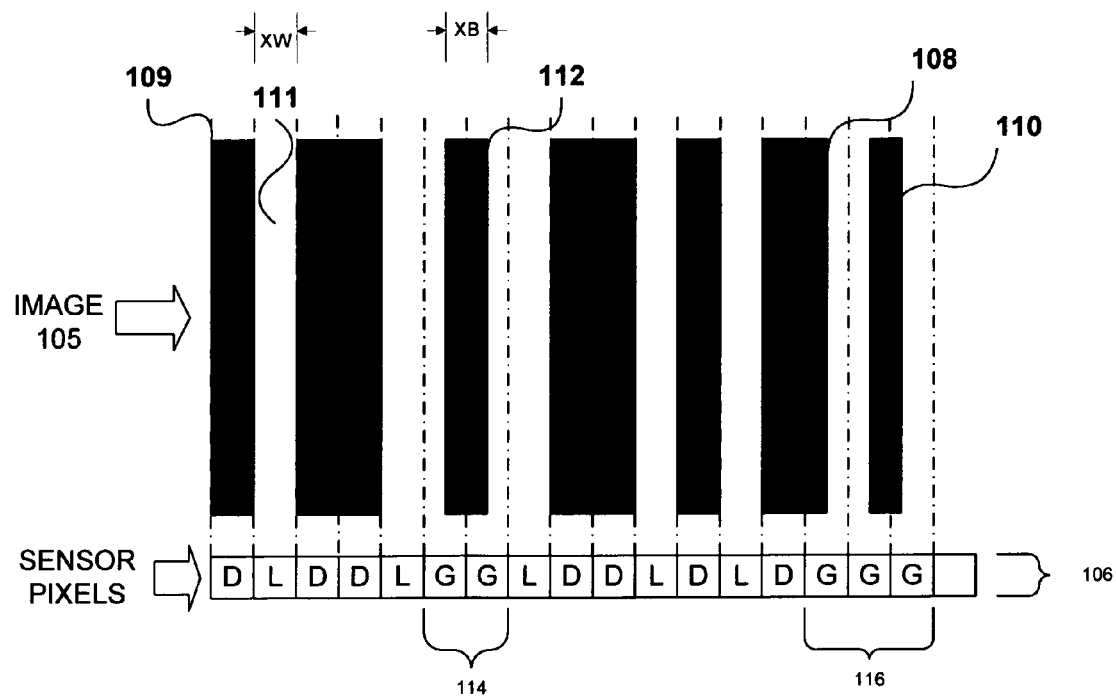
FIG. 1B is a schematic drawing illustrating the alignment of elements of an image of a barcode with the pixels on an image sensor.

The second stage of the process attempts to re-construct the bar sequence that created the gray areas based on heuristic rules. In one embodiment the heuristic rules take into account such factors as the width in pixels of the gray areas, the bar code elements that bound the gray area, known minimum and maximum bar sizes, and the like. Other embodiments can, of course, include other factors. At box 222, any strings of unresolved gray pixels are identified. A string of gray pixels comprises one or more adjacent gray pixels; in FIG. 1B, for example, the two-pixel gray area 114 is a two-pixel string and the three-pixel area 116 is a three-pixel string.

For each string of unresolved gray pixels identified at box 222, the process at box 224 identifies the bar code elements that bound the gray string. At box 226, using the bounding elements and other factors in the heuristic rules, the process identifies the sequence of elements in the original bar code that created the string of gray pixels. At box 228, the process checks whether there are any strings of gray pixels that cannot be resolved. If there are none, meaning that all strings of gray pixels were successfully resolved, then the process continues to box 230 and there is a successful decode. If there are any remaining strings of gray pixels that cannot be resolved, the process ends at box 232 with an unsuccessful decode. Further details of this second stage of the process are discussed below in connection with FIGS. 5A–5C.

Figures 3A, 3B:
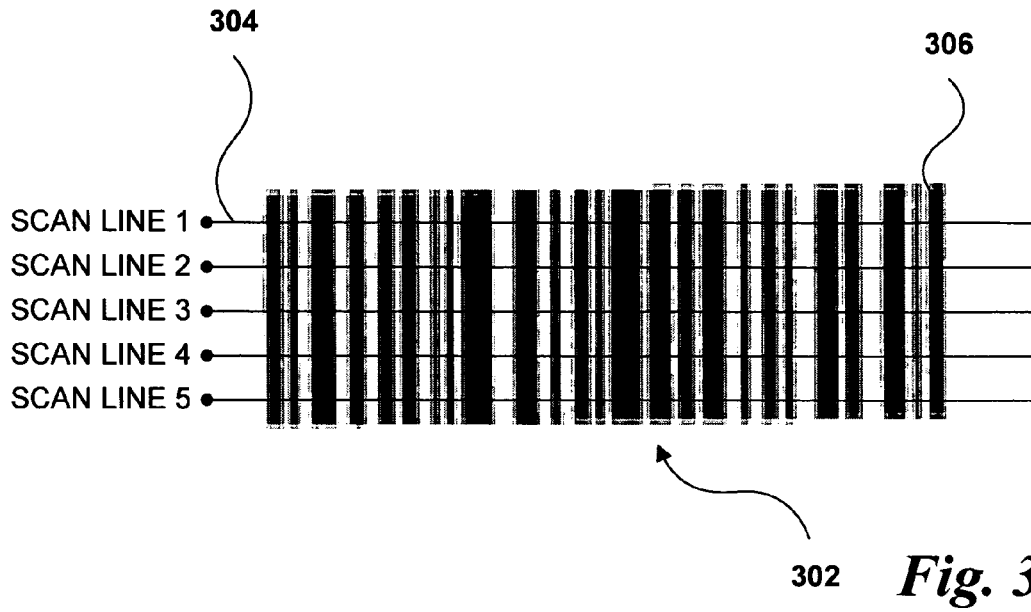
FIGS. 3A and 3B show and embodiment of a process for collecting pixel intensity data from a digital image of an optically readable symbol such as a barcode.

FIGS. 3A–3B illustrate an embodiment of a process for collecting pixel intensity data from an image of a barcode. FIG. 3A illustrates the processing of an image 302 of a barcode. To obtain pixel intensity data, one or more line scans are conducted across the image 302, beginning from the leading edge 304 of the image and ending after the trailing edge 306. As the line scan takes place, the intensity of each pixel along the line is recorded. In the embodiment shown there are five scans, each across a different part of the image 302. In other embodiments, a greater or lesser number of scans can be used, and the scans need not be across different parts of the bar code. FIG. 3B illustrates in tabular form what the resulting data could look like for the five scan-line process shown in FIG. 3A. The data shown in the table summarizes what one would see after some processing of the raw pixel intensity data. For purposes of further analysis, the raw pixel intensity data is what would actually be used, not the L's D's and G's shown in the table. For each scan line, the scan identifies light (L) areas, dark (D) areas and gray (G) areas of varying pixel length. Thus, the first scan line has identified a 5 pixel light area, followed by a 3-pixel gray area, followed by a 1-pixel dark area and so on. When there are multiple scan lines, the final values used for further analysis can be determined in various ways. In one embodiment, for example, the final intensity value used for a given pixel can be the one that occurs most often over the five scan lines. In another embodiment, the final intensity value for the pixel can be the average over the five scan lines.

Figure 4A:
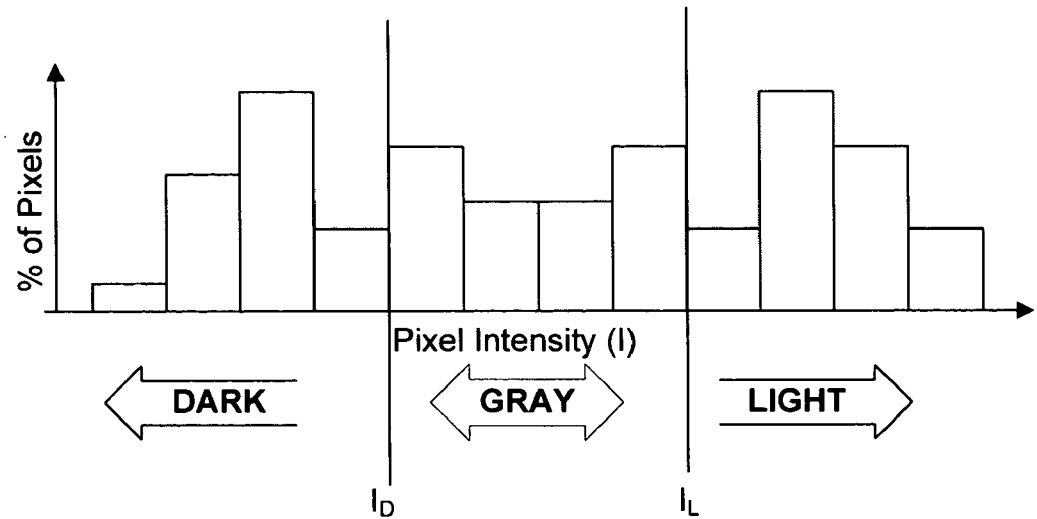
FIGS. 4A–4C are embodiments of histograms computed from the pixel intensity data collected, in one embodiment, as shown in FIG. 3A.
Figure 4B:
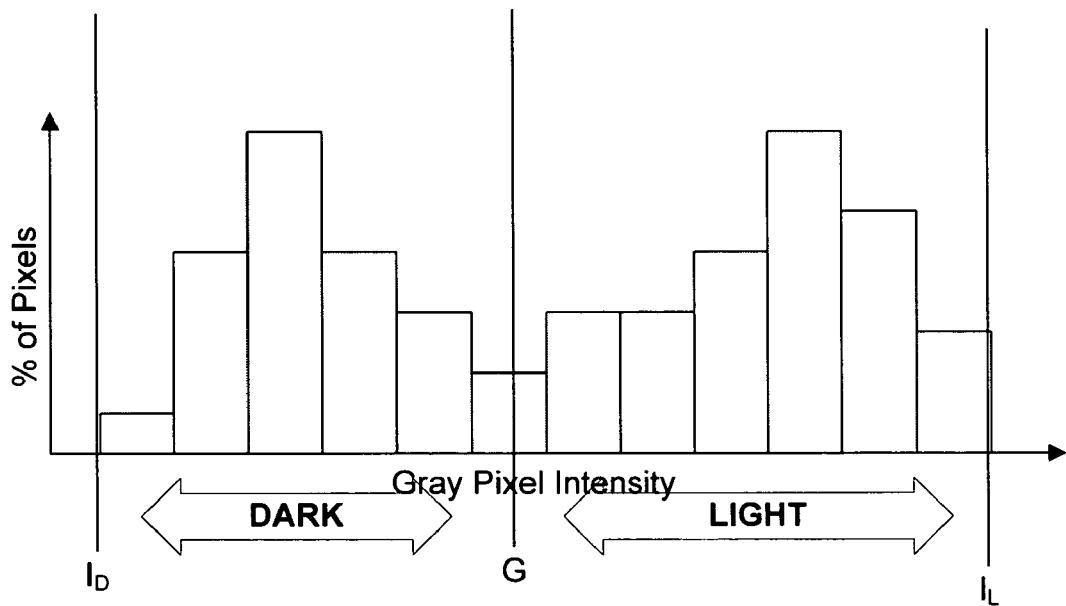
Figure 4C:
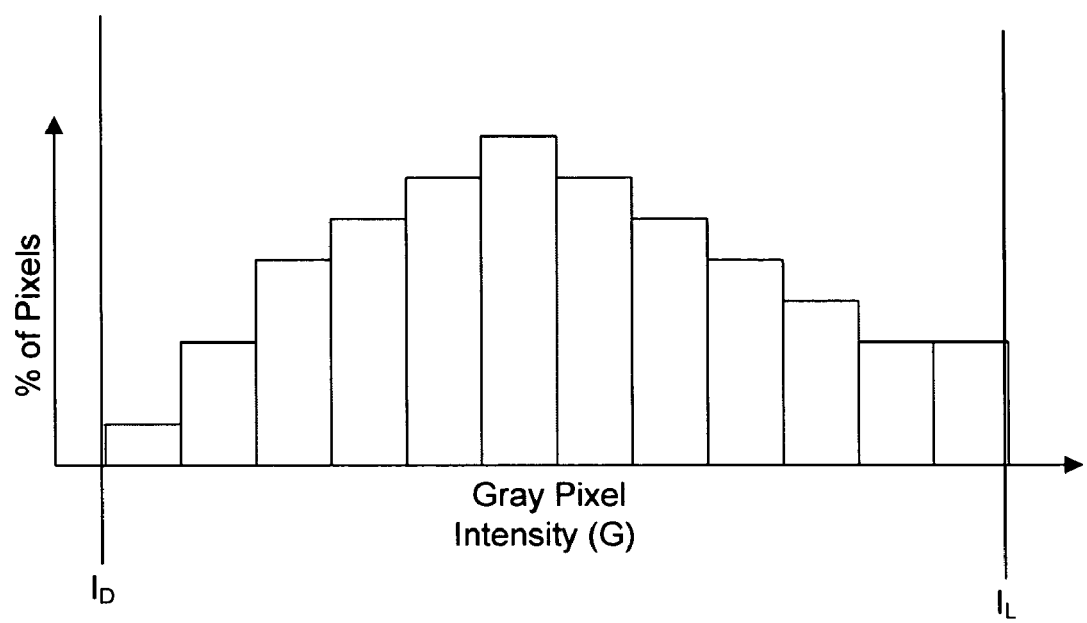

FIGS. 4A–4C together illustrate the first stage of the two-stage decoding process. Having collected pixel intensity data, for example as discussed above for FIGS. 3A–3B, the pixel intensity data is used to compute a histogram. For each value of pixel intensity, the histogram computes the number, percentage or fraction of pixels having that particular intensity. For analysis purposes, the process need only compute the necessary data; it is not necessary for the process to construct a graphic histogram such as the one shown in the figure. Once the histogram data is computed, a thresholding algorithm is applied to the data to determine an upper intensity threshold $I_L$ and a lower intensity threshold $I_D$. In one embodiment, well-known optical thresholding algorithms such as the bottom-hat algorithm can be used, although in other embodiments other types of algorithms can be applied as well. With the upper threshold $I_L$ and the lower threshold $I_D$ computed, the pixels can be initially classified. Pixels with intensity lower than $I_D$ are classified as dark pixels, pixels with an intensity higher than $I_L$ are classified as light pixels, and pixels with an intensity between $I_D$ and $I_L$ are classified as gray pixels.

FIG. 4B illustrates an embodiment of a second round of thresholding that occurs after the initial classification of the pixels. The purpose of the second round is to take a closer look at the gray pixels to see if they can be re-classified as light or dark. In one embodiment, well-known optical thresholding algorithms such as the bottom-hat algorithm can be used, although in other embodiments other types of algorithms can be applied as well. Moreover, this second round of thresholding need not use the same thresholding algorithm used in the first round. In this second round, a thresholding algorithm is applied only to that portion of the histogram representing gray pixels, that is, only to pixels with an intensity between $I_D$ and $I_L$. In the embodiment shown, the distribution of intensities among the gray pixels is approximately bi-modal, and the second thresholding results in a single threshold G. With the threshold G established, substantially all of the gray pixels can be re-classified. Gray pixels with intensity lower than G are re-classified as dark pixels, while gray pixels with intensity higher than G are re-classified as light pixels.

FIG. 4C illustrates another embodiment of the second round of thresholding applied to the gray pixels. This embodiment of the second thresholding is similar to the second round of thresholding applied in FIG. 4B, but in this embodiment the distribution of intensities of the gray pixels is not bi-modal, meaning that the thresholding will be unable to establish a threshold that will allow re-classification of all the gray pixels into light or dark pixels. When a threshold cannot be established, the gray pixels remain unresolved and the process must proceed to a heuristic analysis to determine what combination of elements in the bar code image created the gray pixels. The distributions shown in FIGS. 4B and 4C represent the extremes, in which either all gray pixels can be re-classified through thresholding (FIG. 4B) or none can (FIG. 4C). In other embodiments, the distribution of intensities of the gray pixels may be such that some of the gray pixels can be re-classified and some cannot; in such a case, the heuristic analysis can be applied to any gray pixels that remain unresolved.

Figure 5A:
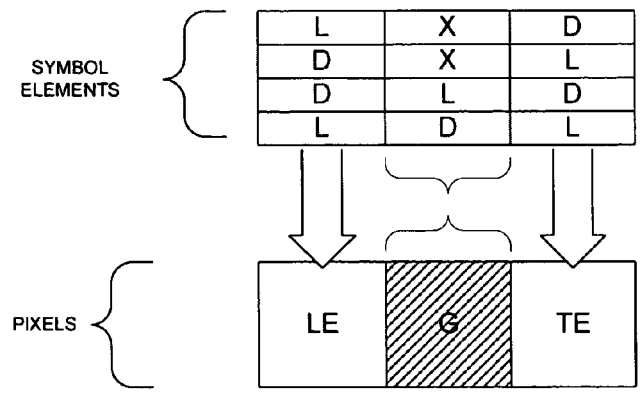
FIGS. 5A–5C are drawings showing heuristic decoding of unresolved strings of gray pixels.
Figure 5B:
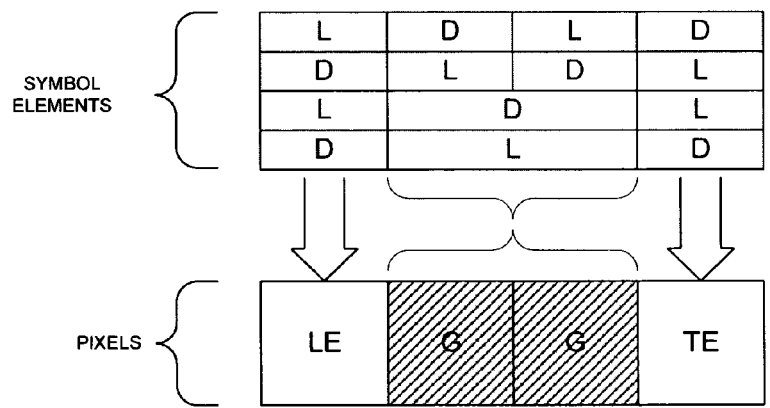
Figure 5C:
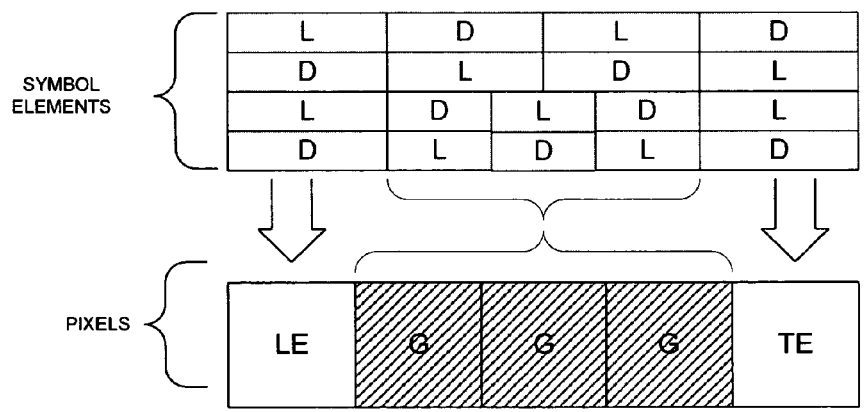

FIGS. 5A–5C illustrate embodiments of a second stage of analysis in which heuristic processes are used to identify the bar sequence that created any strings of gray pixels that remain unresolved after the first stage of analysis. A string of gray pixels comprises one or more adjacent gray pixels; in FIG. 1B, for example, the two-pixel gray area 114 is a two-pixel string and the three-pixel area 116 is a three-pixel string. In the embodiments shown, the heuristic analysis takes into account such factors as the bar code elements that bound the string of gray pixels, maximum and minimum pixel widths for the images of the narrow bar code elements, knowledge of transition contrast between bars, and knowledge that black bars must always alternate with white bars. For example, the heuristic analysis shown takes into account the bar code elements that bound the strings of gray pixels, a 1-pixel minimum width and a 2-pixel maximum width for images of the narrow bar code elements, knowledge of transition contrast between bars, and knowledge that black bars must always alternate with white bars. The figures illustrate embodiments of the process for 1-, 2- and 3-pixel strings, but the principles can be extended to longer strings.

FIG. 5A illustrates an embodiment of a process for resolving a 1-pixel gray string. The gray pixel is bounded by a leading element (LE) and a trailing element (TE). The table above the pixels illustrates the possible combinations for LE and TE, and the corresponding resolution of the gray pixel. The top row of the table, for example, illustrates a case in which the LE is light (L) and the TE is dark (D). In this case, it is impossible to resolve the one-pixel gray area and it is taken to be an extension of either the LE or the TE or both; but since it is impossible to determine which it is, the X in the table therefore indicates that the pixel is ignored. The third row of the table illustrates a case in which the LE is dark (D) and the TE is also dark (D). In this case, the 1-pixel gray string can be resolved into a light pixel.

FIG. 5B illustrates an embodiment of a process for resolving a 2-pixel gray string. As above, the 2-pixel gray string is bounded by a leading element (LE) and a trailing element (TE), and the table above the pixel string illustrates the different possible combinations for LE and TE and the corresponding resolution of the gray pixel. The top row of the table, for example, illustrates a case in which the LE is light (L) and the TE is dark (D). In this case, the 2-pixel gray string can be resolved into a dark pixel followed by a light pixel, because this result satisfies the alternation, transition contrast and minimum width requirements. The third row of the table illustrates a case in which the LE is light (L) and the TE is also light (L). In this case, the 2-pixel gray string can be resolved into one dark bar because this result satisfies the alternation, transition contrast and minimum and maximum width requirements for the bars.

FIG. 5C illustrates an embodiment of a process for resolving a 3-pixel gray string. As above, the 3-pixel gray string is bounded by a leading element (LE) and a trailing element (TE), and the table above the pixels illustrates the different possible combinations for LE and TE and the corresponding resolution of the 3-pixel gray string. The top row of the table, for example, illustrates a case in which the LE is light (L) and the TE is dark (D). In this case, the 3-pixel gray string can be resolved into a dark bar followed by a light bar because this results satisfies the alternation, transition contrast and minimum and maximum width requirements. The third row of the table illustrates a case in which the LE is light (L) and the TE is also light (L). In this case, the 3-pixel gray string can be resolved into a dark-light-dark (D-L-D) sequence of bars, since this is the combination that meets the alternation, transition contrast and minimum and maximum width requirements.

Figure 6:
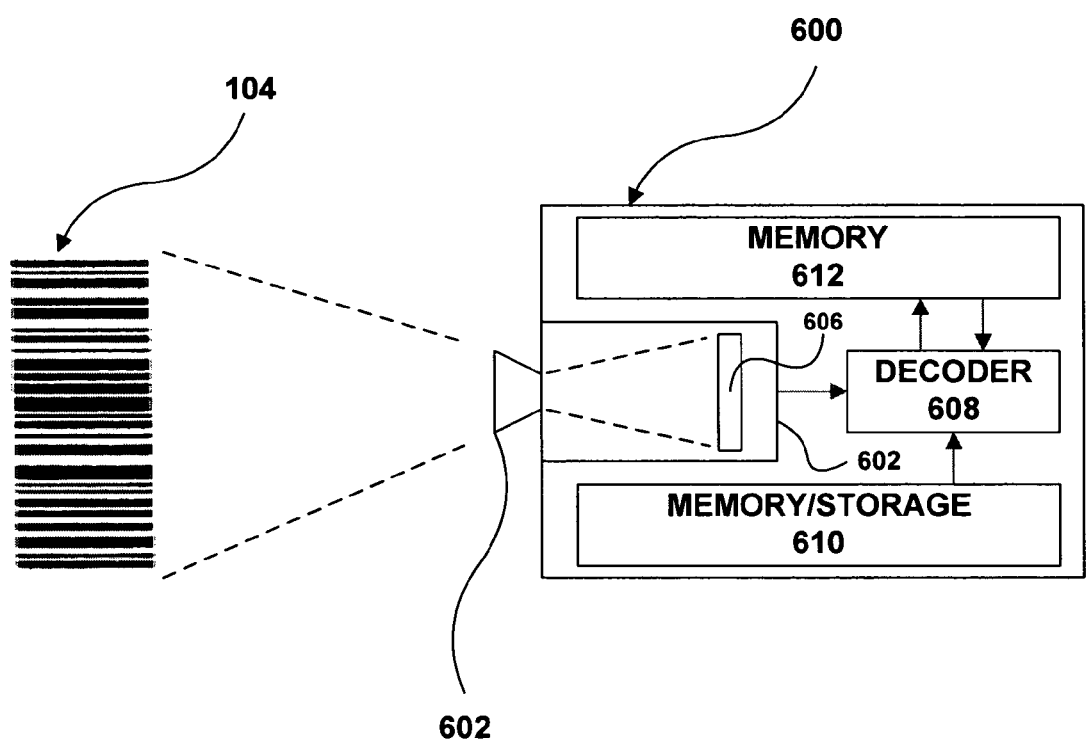
FIG. 6 is a block diagram of an embodiment of an apparatus for implementing the embodiment of the process shown in FIG. 2.

FIG. 6 illustrates an embodiment of the invention a vision system 600. The vision system 600 includes a camera 602 coupled to a decoder 608. The decoder is coupled to a non-volatile memory/storage 610 and a volatile memory 612. The camera 602 includes an image sensor 606 and focusing optics 604 that focus an image of the bar code 104 onto the sensor 606. In one embodiment the focusing optics are refractive, but in other embodiments the focusing optics can be refractive, diffractive, reflective, or a combination of these or some subset thereof. Once the optics 604 focus an image on the image sensor 606, the sensor captures a one- or two-dimensional image of the bar code. In one embodiment the image sensor is a charge coupled device (CCD) array, but in other embodiments different types of image sensors can be used.

The decoder 608 is coupled to the output of the image sensor 606 and includes a processor to process image information received from the sensor. The decoder is also coupled to a non-volatile memory or storage 610 that, among other things, stores instructions that direct the decoder in performing its functions. In one embodiment, the memory or storage 610 can, for example, have instruction stored thereon that direct the decoder to implement the processes described above in connection with FIGS. 2, 3A–3B, 4A–4C and 5A–5C. The decoder is also coupled to a volatile memory 612 so that it can store and retrieve data while it decodes optical symbols. In the embodiment shown, the memory 612 and the memory/storage 610 are shown physically separate from the decoder, but in other embodiments one or both of the memory 612 and the memory/storage 610 can be integrated on the same unit with the decoder. Moreover, in the embodiment shown the decoder 608 is a physically separate unit from the image sensor 606, although in other embodiments the image sensor 606 and decoder 608 can be integrated on the same device. The decoder can also be implemented in hardware or software.

In one embodiment of the operation of the vision system 600, the camera 602 uses its optics 604 to cast an image of bar code 104 onto image sensor 606. Image sensor 606 captures a one- or two-dimensional digital image of the bar code, and the digital image is transmitted to the decoder 608. The decoder 608, in conjunction with memory 612 and using instructions retrieved from memory/storage 610, processes the image of the bar code using the processes described above in connection with FIGS. 2, 3A–3B, 4A–4C and 5A–5C.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. A process comprising:
computing a histogram of pixel intensity data collected from a digital image of an optically readable symbol including light and dark elements of varying width;
thresholding the histogram, wherein thresholding the histogram comprises:
thresholding the histogram to classify individual pixels as light pixels, dark pixels or gray pixels, and
thresholding only the portion of the histogram corresponding to gray pixels to re-classify the gray pixels into dark pixels, light pixels or unresolved gray pixels; and
heuristically analyzing each string of unresolved gray pixels to determine the elements of the optically readable symbol that created the string of unresolved gray pixels.

2. The process of claim 1, further comprising collecting pixel intensity data from one or more line scans across the digital image of the optically readable symbol.

3. The process of claim 2, further comprising, for each pixel, averaging the intensities collected during each of the one or more line scans.

4. The process of claim 1 wherein thresholding the histogram to classify individual pixels as light pixels, dark pixels or gray pixels comprises applying a bottom-hat algorithm to the pixel intensity data.

5. The process of claim 1 wherein thresholding only the portion of the histogram corresponding to gray pixels comprises applying a bottom-hat algorithm to the gray pixel intensity data.

6. The process of claim 1 wherein analyzing each string of unresolved gray pixels heuristically comprises analyzing each string based on the number of pixels in the string and the symbol elements bounding the string.

7. The process of claim 6 wherein the heuristic analysis is further based on minimum and maximum widths, measured in pixels, of the images of the elements of the optically readable symbol.

8. The process of claim 7 wherein the minimum narrow element width is approximately between 1 pixel and 2 pixels.

9. An apparatus comprising:
a decoder including a processor programmed with instructions to:
compute a histogram of pixel intensity data collected from a digital image of an optically readable symbol including light and dark elements of varying widths;
threshold the histogram to classify individual pixels as light pixels, dark pixels or gray pixels, and
threshold only the portion of the histogram corresponding to gray pixels to re-classify the gray pixels into dark pixels, light pixels or unresolved gray pixels; and
heuristically analyze each string of unresolved gray pixels to determine the elements of the optically readable symbol that created the string of unresolved gray pixels.

10. The apparatus of claim 9 wherein the processor is further programmed with instructions to collect pixel intensity data from one or more line scans across the digital image of the optically readable symbol.

11. The apparatus of claim 10, wherein the processor is further programmed with instructions to, for each pixel, average the intensities collected during each of the one or more line scans.

12. The apparatus of claim 9 wherein the instructions to threshold the histogram to classify individual pixels as light pixels, dark pixels or gray pixels comprise instructions to apply a bottom-hat algorithm to the pixel intensity data.

13. The apparatus of claim 9 wherein the instructions to threshold only the portion of the histogram corresponding to gray pixels comprise instructions to apply a bottom-hat algorithm to the gray pixel intensity data.

14. The apparatus of claim 9 wherein the instructions to heuristically analyze each string of unresolved gray pixels comprise instructions to analyze each string of unresolved gray pixels based on the number of pixels in the string and the symbol elements bounding the string.

15. The apparatus of claim 14 wherein the instructions to heuristically analyze each string of unresolved gray pixels further comprise instructions to analyze each string of unresolved gray pixels based on minimum and maximum widths, measured in pixels, of the images of narrow elements of the optically readable symbol.

16. The apparatus of claim 15 wherein the minimum narrow element width is approximately between 1 pixel and 2 pixels.

17. A system comprising:
a camera to capture a digital image of an optically readable symbol, wherein the optically readable symbol includes light elements and dark elements of varying widths;
a decoder coupled to the camera;
a storage or memory coupled to the decoder, the storage or memory having stored thereon instructions that, when executed by the decoder, cause the decoder to:
compute a histogram of pixel intensity data collected from a digital image of an optically readable symbol including light and dark elements;
threshold the histogram to classify individual pixels as light pixels, dark pixels or gray pixels, and
threshold only the portion of the histogram corresponding to gray pixels to re-classify the gray pixels into dark pixels, light pixels or unresolved gray pixels; and heuristically analyze each string of unresolved gray pixels to determine the elements of the optically readable symbol that created the string of unresolved gray pixels.

18. The system of claim 17 wherein the instructions further include instructions to collect pixel intensity data from one or more line scans across the digital image of the optically readable symbol.

19. The system of claim 18, wherein the instructions further include instructions to, for each pixel, average the intensities collected during each of the one or more line scans.

20. The system of claim 17 wherein the instructions to threshold the histogram to classify individual pixels as light pixels, dark pixels or gray pixels comprise instructions to apply a bottom-hat algorithm to the pixel intensity data.

21. The system of claim 17 wherein the instructions to threshold only the portion of the histogram corresponding to gray pixels comprise instructions to apply a bottom-hat algorithm to the gray pixel intensity data.

22. The system of claim 17 wherein the instructions to heuristically analyze each string of unresolved gray pixels comprise instructions to analyze each string of unresolved gray pixels based on the number of pixels in the string and the symbol elements bounding the string.

23. The system of claim 22 wherein the instructions to heuristically analyze each string of unresolved gray pixels further comprise instructions to analyze each string of unresolved gray pixels based on minimum and maximum widths, measured in pixels, of the images of the elements of the optically readable symbol.

24. The system of claim 17 wherein the minimum narrow element width is approximately between 1 pixel and 2 pixels.

* * * * *